UNITED STATES PATENT OFFICE.

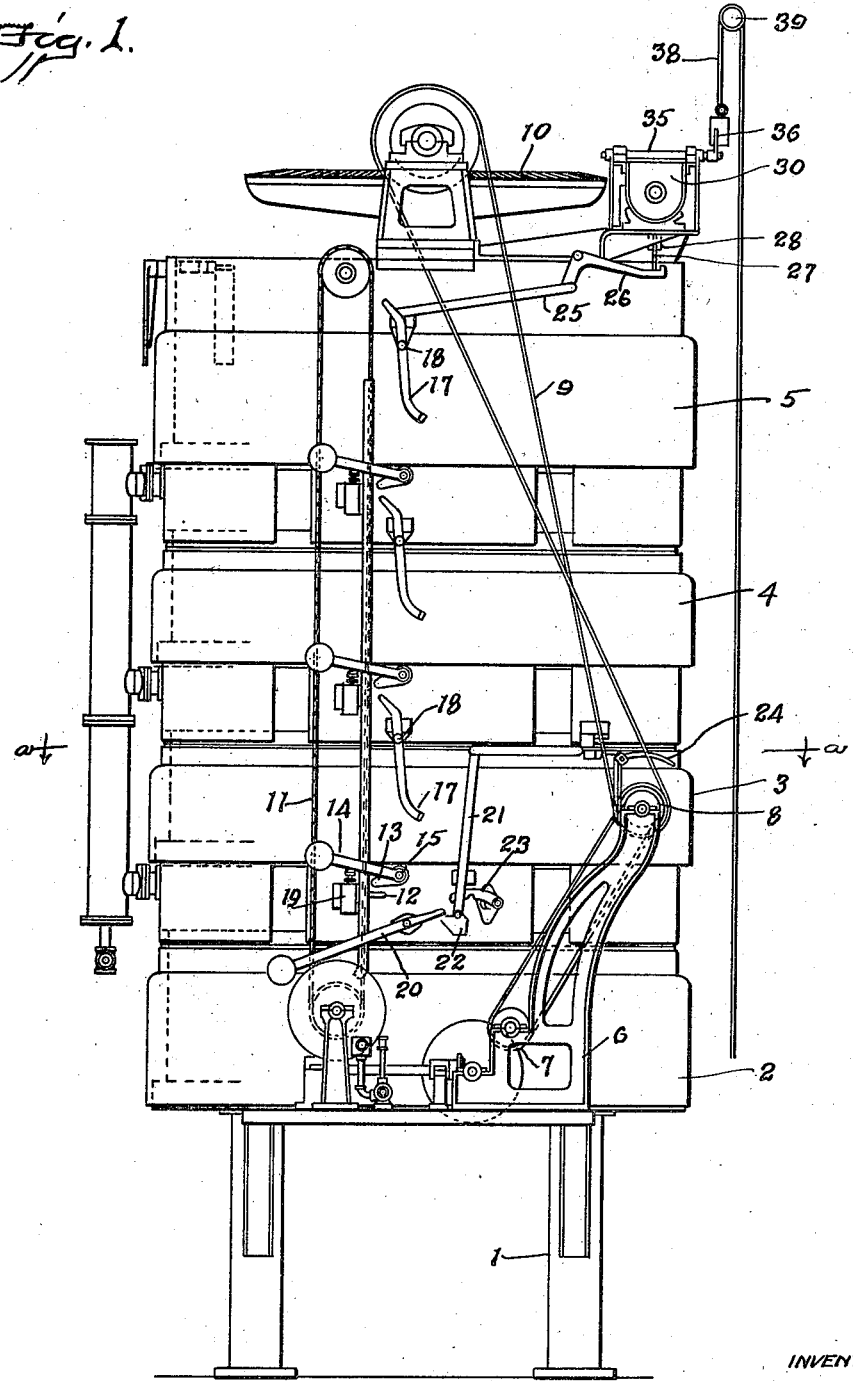

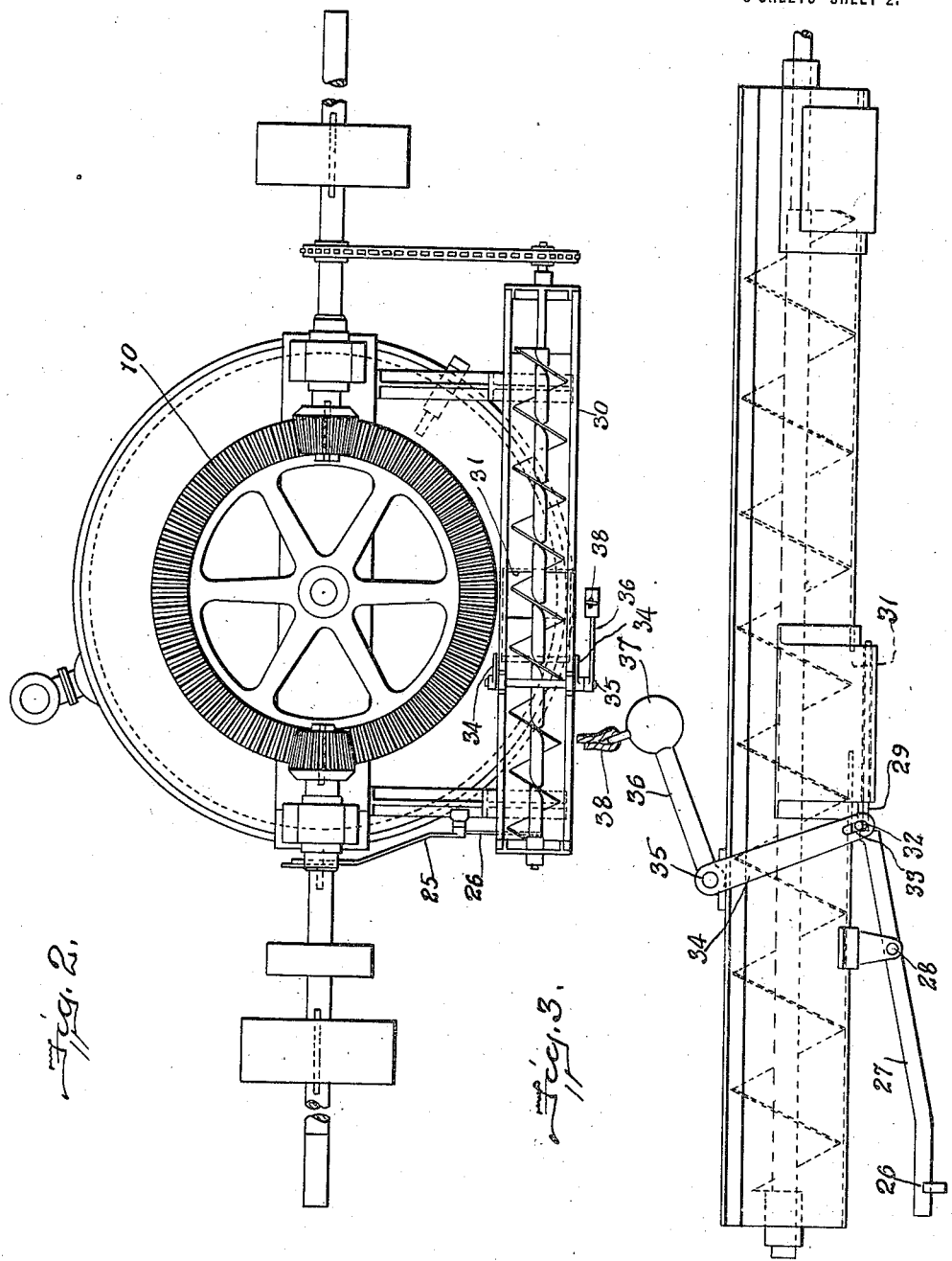

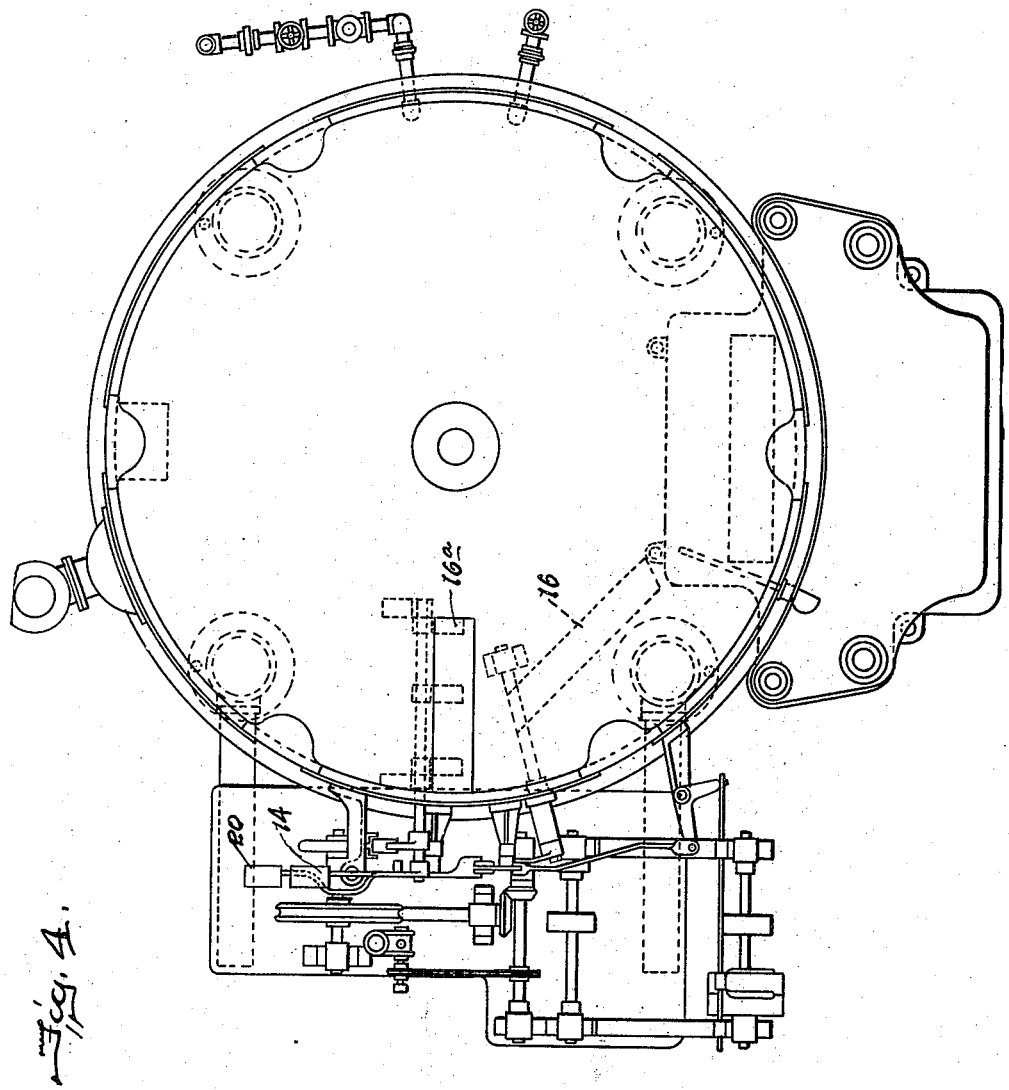

RUSSELL A. TRACE, OF DAYTON, OHIO, ASSIGNOR TO BUCKEYE IRON AND BRASS WORKS, OF DAYTON, OHIO, A CORPORATION OF OHIO.

COOKER FOR OIL-BEARING MATERIAL.

1,425,811.   Specification of Letters Patent.   Patented Aug. 15, 1922.

Application filed October 28, 1920. Serial No. 420,112.

*To all whom it may concern:*

Be it known that I, RUSSELL A. TRACE, a citizen of the United States, residing at Dayton, in the county of Montgomery and State of Ohio, have invented certain new and useful Improvements in Cookers for Oil-Bearing Material, of which the following is a specification, reference being had therein to the accompanying drawing.

My invention relates to cookers for oil bearing material and in particular to an overhead feed for said cookers.

The object of my invention is to feed the uppermost kettle of a cooker a quantity of oil bearing material after the upper kettle has been exhausted of its charge.

In particular it is my object to employ my invention in connection with a construction, such as set forth in my Patent No. 1,254,745, of Jany. 29th, 1918, but I do not desire to limit myself to that particular construction which is only illustrated here because I find it to be my preferred form at present.

It is an object of my invention to provide a mechanism which can be controlled by the operator for determining the height of meal in the upper kettle, but need not depend upon his attention for dumping material into the kettle immediately after it has been emptied.

In the accompanying drawings:—

Fig. 1 is a side elevation of a cooker with my improvement assembled upon it;

Fig. 2 is a top plan view of a cooker and my improved overhead feed;

Fig. 3 is a side elevation in detail of the improved feeding mechanism; and

Fig. 4 is a plan view of a cooker taken on the line *a—a* of Fig. 1 showing the operative mechanism near the base of the cooker.

Referring to the drawings, at 1 are shown the supports upon which the kettles 2, 3, 4 and 5 are mounted, one over the other. 6 is a support for the pulleys 7 and 8 which drive the dumping mechanism of the kettles. Power is derived from a belt 9 and a mechanism 10 for driving these pulleys. 11 is an endless belt or chain carrying a lug 12 which travels in the direction of the arrow. This lug successively comes in contact with the projecting fingers 13 which are rigidly attached to the weighted arms 14. 13 and 14 are both fixed to a shaft 15 upon which is mounted a float or blade 16, see Fig. 4. This blade rests upon the top level of the meal in a customary manner. 17 is a catch or support pivoted at 18. 19 is a spring buffer for supporting the weighted arm 14. 20 is a weighted arm used to unlock a latch 21 as it passes by a block 22. 23 is a latching arm pivoted to the blade 16. Through 21 a connection is made to 23 and a belt shifter 24 which shifts the belt from tight to loose pulley, or loose to tight pulley, as the case may be. On the topmost cooker there is a rod 25 connected to a bell crank 26. 26 in turn engages a locking rod 27 pivoted at 28 having one end engaging 26 and the other end engaging (see Fig. 3) the end of the bottom plate 29 of a charging conveyor 30. 29 closes the charging aperture 31. 27 is free to be disengaged from 29 when it is moved upwardly and has no positive connection with 29. 29 is connected pivotally at 32 by a pin working in a slot 33 in an arm 34 constituting one member of a bell crank pivoted at 35 and having its other member pivoted at 36. On the end of 36 is a weight 37 to which is attached an operating cord 38 which passes upwardly over the pulley 39 and downwardly to the operator.

*Method of operation.*—The method of operation of the apparatus is as follows:—

Meal is fed into the screw conveyor 30 until it is appropriately filled.

The endless carrier 11 is operating, being driven through the train of gears from the tight pulley at 8. As this endless carrier moves on the right hand side upwardly with the lug 12 which successively comes in contact with the fingers 13 of the several dumping gates 16ª, the kettles 3, 4 and 5 are successively dumped, it being understood that the lowermost kettle is emptied. When the lug gets to the topmost kettle, designated 5, it lifts the weighted arm 14 and throws it against the member 17 where it remains, having passed over dead center. In this position the gate 16ª is opened and the topmost kettle dumps into the next kettle below. This dumping operation takes place, due to the usual stirrers moving the meal around in the kettle, during the period that it takes the lug 12 to pass from the point where it came in contact with the member 13 until it comes in contact with the upper portion of 17 near the top of the cooker. When it does so it moves 17 to the left hand and throws the weighted lever over the dead center and back into a position which closes the gate 16ᵃ, thus sealing the bottom of the topmost cooker. The movement of the top of the member 17 to the right by reason of 12 coming in contact with it also moves 25 to the right which, in turn, lifts the bell crank 26. This results in moving upwardly the left hand end (see Fig. 3) of 27 around its pivotal connection 28 and thus freeing the end of 27 where it is in engagement with the plate 29 sealing the dumping aperture 31. The weight 37 on the bell crank 36, 34, 35 moves downwardly, no longer being held in its uppermost position by 27, so that the plate 29 slides to the left and opens the aperture 31, allowing the meal to dump into the uppermost cooker. This dumping from the conveyor 30 continues until the operator closes the gate 29 by pulling on the cord 38, allowing 27 to return to its locking position.

This leaves all of the kettles loaded with oil bearing material and leaves the float 16 in a horizontal position in the lowermost kettle, at which point it locks the latch 21 and shifts the belt on the loose pulley, thus stopping the chain 11 after the lug 12 has passed upwardly on the right hand side through a full cycle of operations and lifted the arm 20, effecting through the lug 22 the locking of 21 and 23. When the meal is removed from the lowermost kettle this allows the blade or float 16 to drop downwardly, lift 23, unlatch 21, shift the belt on the tight pulley and start the cycle of operations again.

In practice, however, this occurs but once a week as the meal in the lowermost kettle is removed during each cycle of operations before the chain can come to rest, so that the movement of the chain is substantially continuous from start to finish in the ordinary operation of an oil mill.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, a plurality of kettles, means for dumping one kettle into another, means to feed material into the topmost kettle, means to operate said feeding means after the topmost kettle is dumped of its material, and means to close manually the feeding means.

2. In combination, a plurality of kettles, means for dumping one kettle into another, means to feed material into the topmost kettle, means to operate said feeding means after the topmost kettle is dumped of its material, and means to stop the discharging of the material into the topmost kettle manually at the will of the operator, whereby the quantity of the charge may be varied and controlled at will.

3. In a cooker, the combination, with a plurality of receptacles adapted to discharge material in succession from the first to the last receptacle, and devices for stopping the discharge of said material, of means for operating said devices, means for connecting power to said operating means and disconnecting it therefrom, said connecting and disconnecting means being so arranged that the power will be disconnected from said operating means after the discharge from the first receptacle has been stopped and being arranged to connect the power to said operating means if the material in the last receptacle has not reached a predetermined height, means operable by said operating means for discharging material into said topmost cooker after it has been emptied, a conveyor to convey material to said discharging means, and means of stopping said discharging means at the will of the operator.

4. In a cooker, the combination, with a plurality of receptacles adapted to discharge material from the preceding receptacle into the succeeding receptacle, and means for stopping the discharge of material, of mechanism for operating said stopping means, means for stopping said operating mechanism so arranged that said operating mechanism will continue in operation until the material in the last receptacle has reached a predetermined height, means operable by said operating means for discharging material into said topmost cooker after it has been emptied, a conveyor to convey material to said discharging means, and means of stopping said discharging means at the will of the operator.

5. In a cooker, the combination, with a plurality of receptacles adapted to discharge material from the preceding receptacle into the succeeding receptacle, and means for stopping the discharge of material, of mechanism for operating said stopping means, means for stopping said operating mechanism so arranged that said operating mechanism will continue in operation until the material in the last receptacle has reached a predetermined height, means for locking the operating mechanism against further operation until the material in the last receptacle falls below said predetermined height, means operable by said operating means for discharging material into said topmost cooker after it has been emptied, a conveyor to convey material to said discharging means, and means of stopping said discharging means at the will of the operator.

6. In a cooker, the combination, with a plurality of receptacles adapted to discharge material in succession from the first to the last receptacle, and devices for stopping the discharge of said material, of means for operating said devices, means for connecting power to said operating means and disconnecting it therefrom, said connecting and disconnecting means being so arranged that the power will be disconnected from said operating means after the discharge from the first receptacle has been stopped and being arranged to connect the power to said operating means if the material in the last receptacle has not reached a predetermined height, and locking mechanism for locking said operating means against further operation when the material in the last receptacle reaches said predetermined height and until the material falls below said height, means operable by said operating means for discharging material into said topmost cooker after it has been emptied, a conveyor to convey material to said discharging means, and means of stopping said discharging means at the will of the operator.

7. In a cooker, the combination, with a plurality of receptacles, and means permitting the gravity discharge of material in each receptacle to the next in succession, devices, controlled by the level of the material in the lowest receptacle, for controlling the operation of said means, said devices constantly tending to cause operation of said discharge means, and being restrained from causing such operation when the material in said lowest receptacle is at a predetermined level, means operable by said operating means for discharging material into said topmost cooker after it has been emptied, a conveyor to convey material to said discharging means, and means of stopping said discharging means at the will of the operator.

8. In a cooker, a plurality of kettles discharging one into another, means to successively operate said discharging means and to operate a loading means for the topmost kettle after dumping, and closing the discharging means in the topmost kettle, a dumping means consisting of a conveyor, a sliding gate in the bottom of said conveyor, means to hold said conveyor in locked position to keep it closed until unlatched by said operating means for the gate dumping means, means to open said gate by gravity when said gate is unlocked, and means to close said gate at the will of the operator.

9. In a cooker, a kettle, a conveyor mounted thereon carrying a gate, said gate being adapted to slide relative to said conveyor, a bell crank attached to one end of said gate at one of its ends and to a weight at the other of its ends, means of lifting said weighted end of the bell crank, a latch pivoted beneath the conveyor having one end engaging the gate in its closed position and the other engaging an actuating means, means to dump material from said kettle and to close said dumping means thereafter actuating said gate latch, whereby when the gate is opened the material is allowed to enter the kettle.

In testimony whereof, I affix my signature.

RUSSELL A. TRACE.